(12) United States Patent
Tang

(10) Patent No.: US 7,744,125 B2
(45) Date of Patent: Jun. 29, 2010

(54) OCCUPANT SAFETY DEVICE FOR ROOF REINFORCEMENT

(75) Inventor: Dan Tang, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 12/339,022

(22) Filed: Dec. 18, 2008

(65) Prior Publication Data

US 2009/0102175 A1 Apr. 23, 2009

Related U.S. Application Data

(63) Continuation of application No. 11/276,329, filed on Feb. 24, 2006, now abandoned.

(51) Int. Cl.
*B60R 21/13* (2006.01)
(52) U.S. Cl. .................................. 280/756; 297/216.12
(58) Field of Classification Search ................. 280/756; 297/216.12
See application file for complete search history.

(56) References Cited

U.S. PATENT DOCUMENTS

| | | | |
|---|---|---|---|
| 2,929,637 A | 3/1960 | Constantine | |
| 3,397,911 A | 8/1968 | Brosius | |
| 3,420,572 A | 1/1969 | Bisland | |
| 4,779,928 A * | 10/1988 | Collier et al. | 297/391 |
| 5,056,816 A | 10/1991 | Lutze et al. | |
| 5,094,478 A | 3/1992 | Pfanzeder et al. | |
| 5,110,185 A * | 5/1992 | Schmutz et al. | 297/410 |
| 5,205,585 A | 4/1993 | Reuber et al. | |
| 5,236,219 A | 8/1993 | Jambor et al. | |
| 5,458,396 A | 10/1995 | Rost | |
| 5,484,189 A | 1/1996 | Patterson | |
| 5,626,361 A | 5/1997 | Heiner | |
| 5,655,791 A | 8/1997 | Nowack et al. | |
| 5,806,933 A * | 9/1998 | Tsui et al. | 297/391 |
| 5,836,648 A * | 11/1998 | Karschin et al. | 297/216.14 |
| 5,890,738 A | 4/1999 | Heiner et al. | |
| 5,927,803 A | 7/1999 | Hehl et al. | |
| 6,199,900 B1 | 3/2001 | Zeigler | |
| 6,352,285 B1 | 3/2002 | Schulte et al. | |
| 6,634,707 B2 | 10/2003 | Masuda et al. | |
| 6,805,378 B2 | 10/2004 | Berges et al. | |
| 6,817,628 B2 | 11/2004 | Hovelmann et al. | |
| 6,824,311 B2 | 11/2004 | Bayer et al. | |
| 6,902,190 B2 | 6/2005 | Nass | |
| 7,036,866 B2 | 5/2006 | Perakis | |

(Continued)

FOREIGN PATENT DOCUMENTS

DE 3822461 A1 1/1990

(Continued)

*Primary Examiner*—Faye M. Fleming
*Assistant Examiner*—Nicole Verley
(74) *Attorney, Agent, or Firm*—O'Brien Jones, PLLC

(57) ABSTRACT

An occupant safety device for a motor vehicle having a roof. The safety occupant device comprises a support structure slidably mounted within the vehicle that, upon actuation, extends vertically upwardly within the vehicle to cooperate with the vehicle's roof to increase the amount of weight that the roof can support. The support structure includes an overhanging top portion having a length and a direction of overhang that, upon actuation of the support structure, provide early roof engagement in the event of roof crush.

7 Claims, 8 Drawing Sheets

U.S. PATENT DOCUMENTS

| | | |
|---|---|---|
| 7,070,205 B2 | 7/2006 | Becker et al. |
| 7,156,446 B2 | 1/2007 | Perakis |
| 7,175,199 B2 | 2/2007 | Muller |
| 7,198,294 B2 | 4/2007 | Welch |
| 7,384,067 B2 | 6/2008 | Parks et al. |
| 2005/0280253 A1 | 12/2005 | Queveau et al. |

FOREIGN PATENT DOCUMENTS

| | | |
|---|---|---|
| DE | 4209094 A1 | 9/1993 |
| EP | 504482 A1 | 9/1992 |
| EP | 608794 A1 | 8/1994 |

* cited by examiner

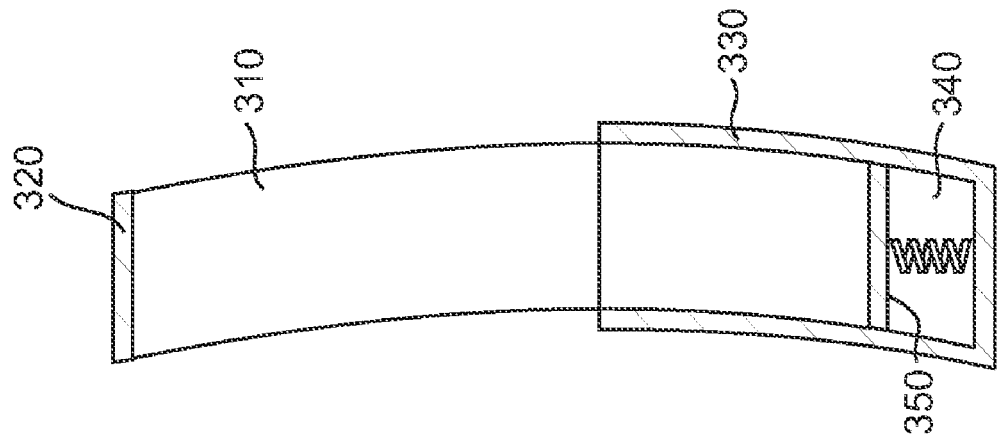
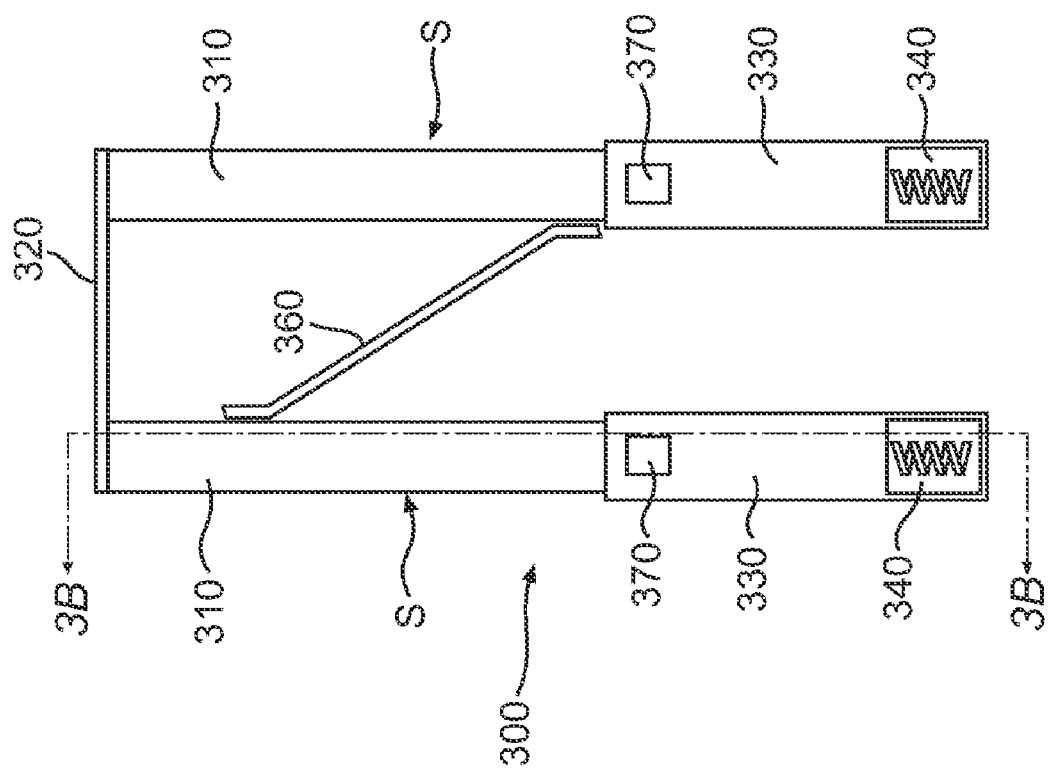

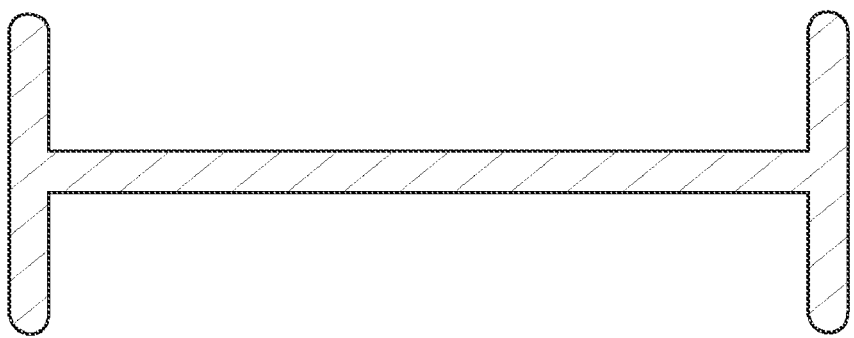
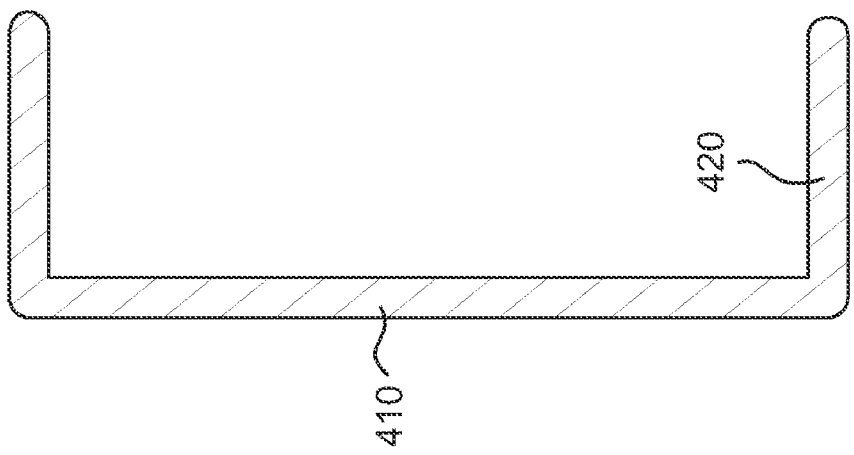
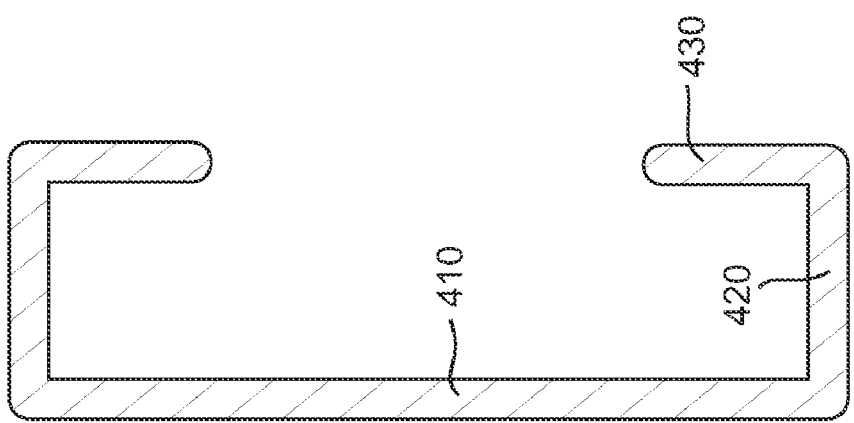

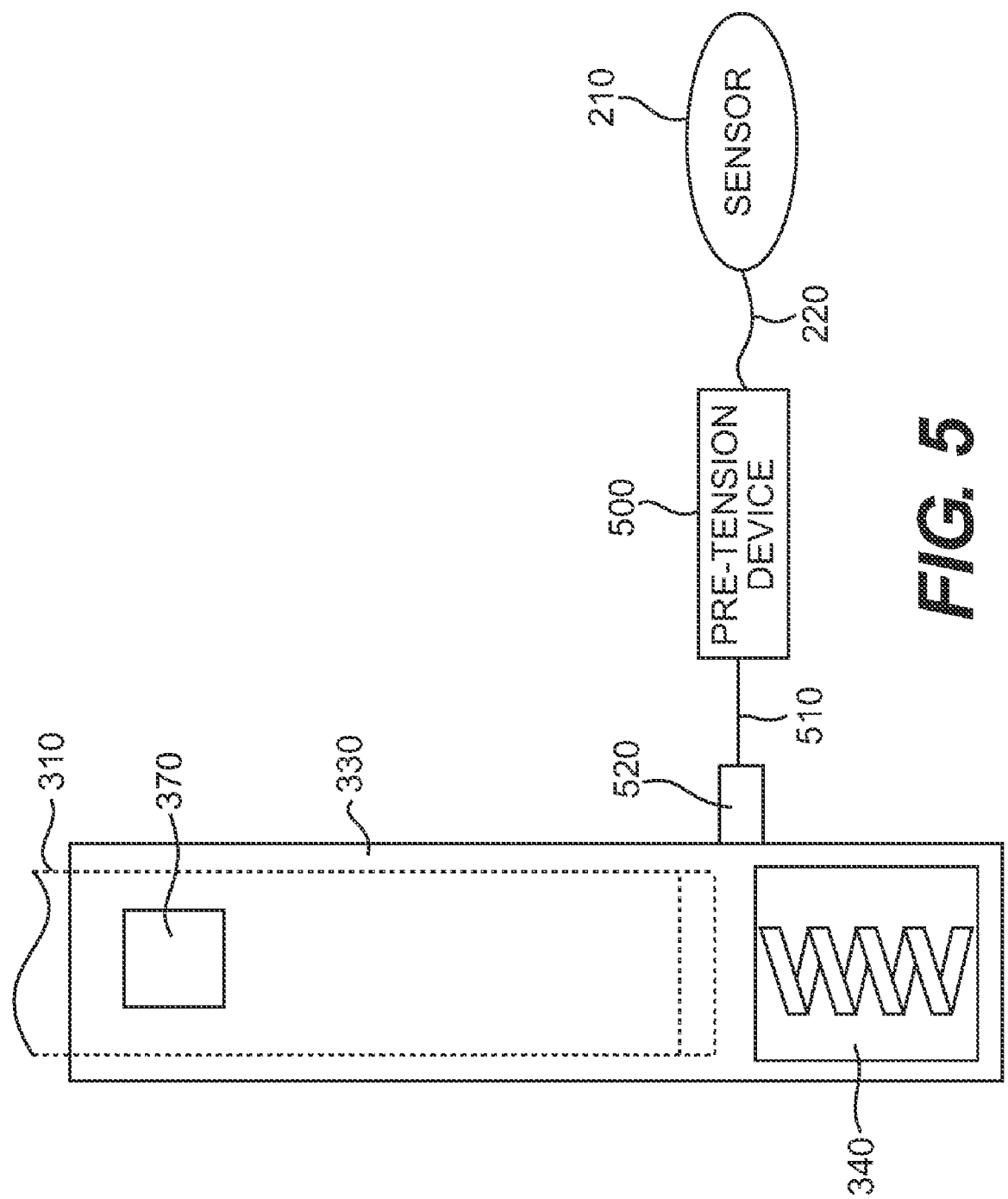

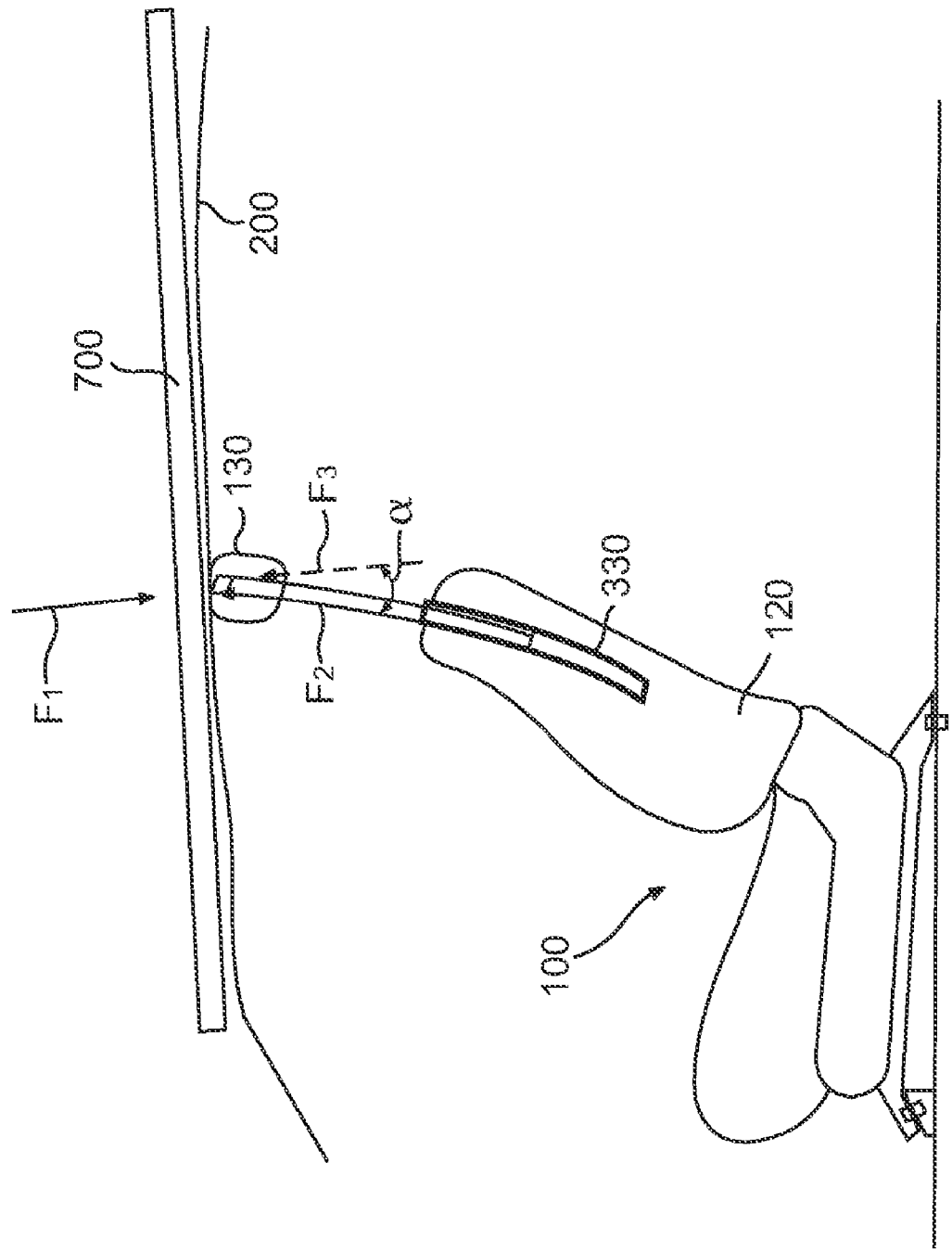

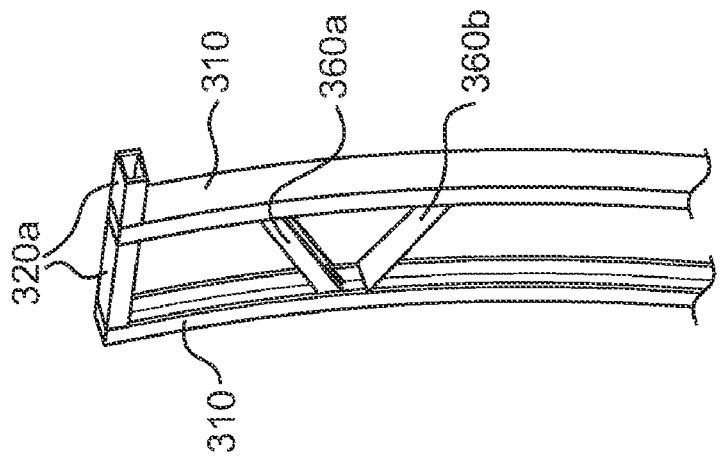
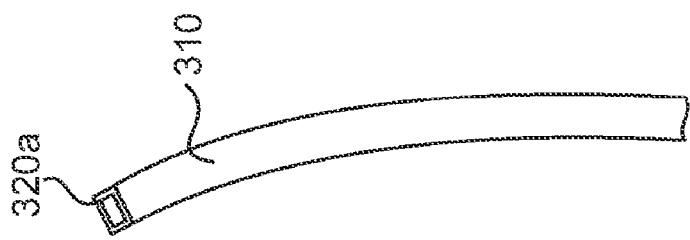
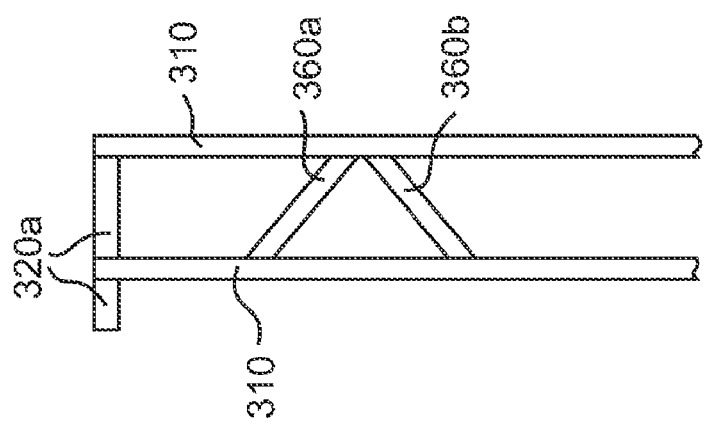
FIG. 8C
FIG. 8B
FIG. 8A

OCCUPANT SAFETY DEVICE FOR ROOF REINFORCEMENT

This is a continuation of Application Ser. No. 11/276,329, filed Feb. 24, 2006, now abandoned the entire content of which is incorporated herein by reference.

BACKGROUND OF THE INVENTION

1. Field of Invention

This invention relates to the field of reinforcing vehicles to lessen roof crush during rollover. More specifically, this invention relates to a reinforcement that can be deployed during a vehicle rollover to cooperate with the vehicle roof to lessen roof crush during the rollover.

2. Background

United States Federal Motor Vehicle Safety Standard (FMVSS) 216 is a requirement designed to protect vehicle occupants in the event of a rollover accident. New standards require that, by 2009, roof deformation be limited to five inches (127 mm) of crush. Under the new standard, a vehicle's roof structure will have to support 2.5 times the vehicle weight or 5,000 pounds, whichever is less (up from the previous requirement of 1.5 times the vehicle weight).

Presently, most non-convertible automobiles have pillared hardtops. A pillared hardtop typically includes a framework of A-pillars, B-pillars, C-pillars, and interconnecting roof rails and headers. This framework protects vehicle occupants should a rollover condition occur, by limiting roof crush. The A-pillars are typically located on the sides of the vehicle's front windshield. The C-pillars are typically located on the sides of the vehicle's rear window. The B-pillars are typically located about midway between the A-pillars and the C-pillars. The roof rails and headers extend between the pillars longitudinally and transversely.

To strengthen roof structures to meet the new requirements, there are a number of alternatives that are commonly used. The most common practice to strengthen the roof structure is to increase the strength of the A-pillar, B-pillar, and C-pillar, as well as the roof rails and headers. Strengthening these elements is most commonly achieved by increasing their size and thickness, which can increase vehicle weight and production costs. Other ways to strengthen these elements include using stronger materials, which may be prohibitively expensive to obtain or use in existing production facilities, and adding additional support elements, which also increases vehicle weight and production costs.

It has been proposed, in convertible vehicles that do not have protective roof structures, to employ rollover bars that are enclosed within or otherwise attached to a vehicle's seat. The rollover bars are activated, upon sensing a rollover condition, to extend upward to protect the seat occupant during rollover. These rollover bars are disclosed to be desirable due to the lack of a protective roof structure in convertible vehicles, and are not adapted or designed to work in cooperation with a pillared hard top to reinforce the pillared hard top.

BRIEF SUMMARY OF THE INVENTION

In one embodiment, the invention is directed to an occupant safety device for a motor vehicle having a roof. The safety occupant device comprises a support structure slidably mounted within the vehicle that, upon actuation, extends vertically upwardly within the vehicle to cooperate with the vehicle's roof to increase the amount of weight that the roof can support. The support structure includes an overhanging top portion having a length and a direction of overhang that, upon actuation of the support structure, provide early roof engagement in the event of roof crush or in the event of a vehicle rollover.

In another embodiment, the invention is directed to a method of making an occupant safety device for a motor vehicle having a roof. The method comprises providing a support structure having an overhanging top portion and slidably mounting the support structure within the vehicle so that, upon actuation, the support structure extends vertically upwardly within the vehicle to cooperate with the vehicle's roof to increase the amount of weight that the roof can support. The overhanging top portion has a length and direction of overhang that provide early roof engagement upon actuation in the event of roof crush.

Further features of the present invention, as well as the structure of various embodiments of the present invention are described in detail below with reference to the accompanying drawings.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the pertinent art to make and use the invention. In the drawings, like reference numbers indicate identical or functionally similar elements.

FIG. 3A is a front view of a reinforcement in accordance with the present invention.

FIG. 3B is a side view of the reinforcement shown in FIG. 3A, taken along line 3A-3A.

FIGS. 4A-4C are alternate cross-sectional views of a portion of a reinforcement in accordance with the present invention.

FIG. 5 illustrates an embodiment of an activation mechanism for a reinforcement in accordance with the present invention.

FIG. 7 illustrates exemplary forces acting on a reinforcement during a rollover simulation test.

FIG. 8A is a front view of an embodiment of a reinforcement of the present invention, with an overhanging top portion.

FIG. 8B is a side view of the reinforcement of FIG. 8A.

FIG. 8C is a perspective view of the reinforcement of FIG. 8A.

DETAILED DESCRIPTION OF THE INVENTION

The present invention provides a roof reinforcement or support structure. An occupant safety device for an automotive vehicle lessens roof crush during vehicle rollover and comprises the roof reinforcement or support structure. The reinforcement is preferably deployed during a vehicle rollover to cooperate with the vehicle roof to limit roof crush.

Figures 1, 2:
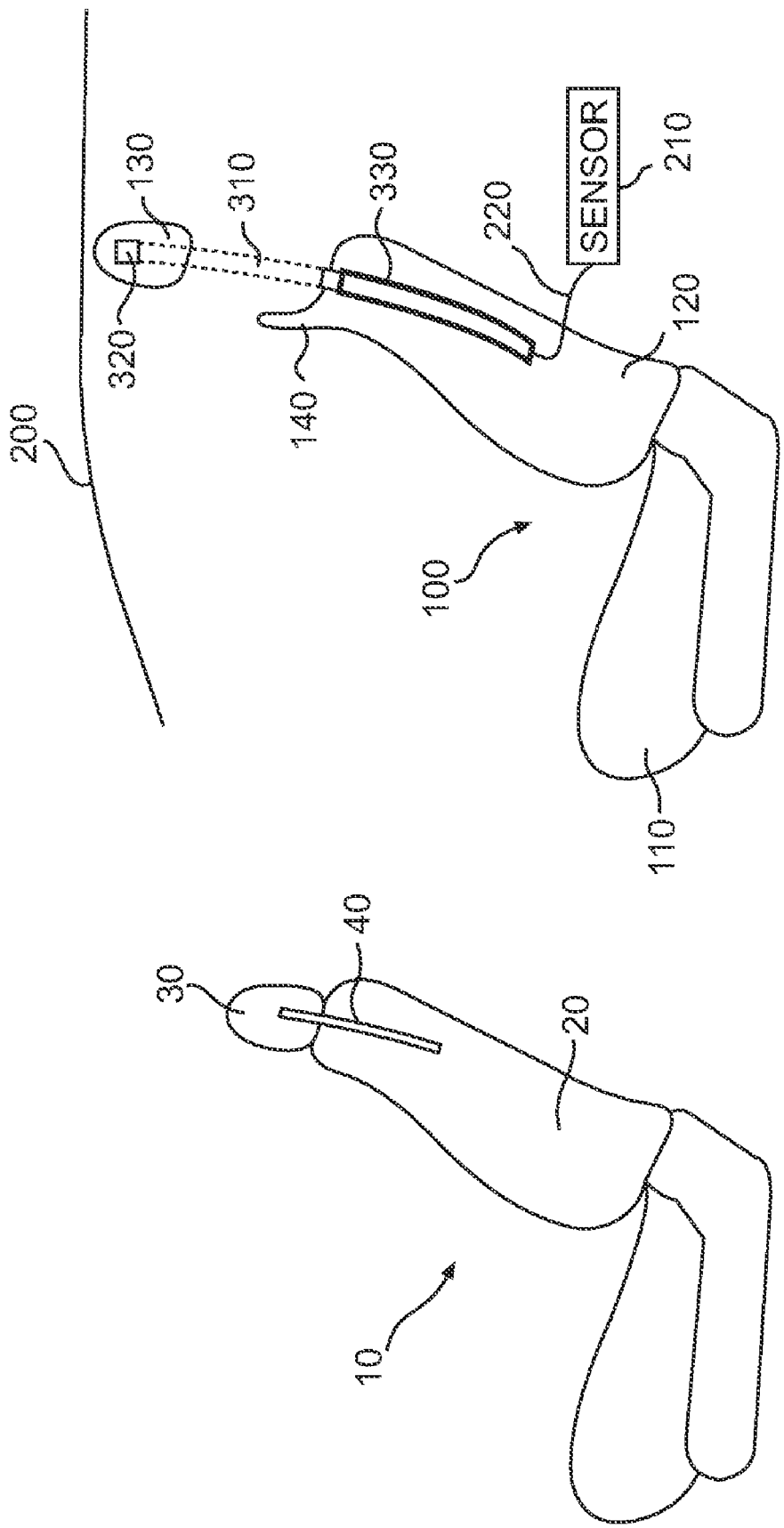
FIG. 1 illustrates a prior art vehicle seat having a headrest.
FIG. 2 illustrates a vehicle seat including a reinforcement in accordance with the present invention.

FIG. 1 illustrates a prior art vehicle seat 10 including a seat back portion 20 and a headrest 30. It is known to mount headrests 30 on the seat back portion 20 via vertical supports 40. It is most common to employ two vertical supports 40 for each headrest 30, and to fashion the supports 40 so that the headrest 30 is vertically adjustable to a limited extent for occupant comfort. It is also known to reinforce vehicle seats in a number of ways to increase occupant safety in the event of side and rear impact collisions.

FIG. 2 illustrates a vehicle seat including an embodiment of a reinforcement in accordance with the present invention. Vehicle seat 100 is situated in a vehicle having a roof portion 200. The seat 100 includes a bottom portion 110 and a back portion 120. The seat 100 also preferably includes a headrest 130. Mounted within the seat 100 is a reinforcement 300 (see FIG. 3A) having at least one vertical portion 310 and a horizontal portion 320. The reinforcement is preferably mounted within the seat back 120 so that its at least one vertical portion 310 can slide substantially vertically within the seat back 120 as shown in FIG. 2.

As schematically illustrated in FIG. 2, a sensor 210 is connected to the reinforcement, preferably via an electrical line 220. The sensor 210 is capable of sensing a condition for which roof reinforcement is desirable. Upon sensing such a condition, the sensor 210 sends a signal to the reinforcement 300 via the electrical line 220 to suitably deploy the reinforcement so that it reinforces the vehicle roof.

As shown in FIG. 2, the seat's headrest 130 preferably covers the horizontal portion 320 of the reinforcement 300. During normal operation of the vehicle, the reinforcement 300 is mounted within the seat back portion 120 in a lowered position (not shown) such that the headrest 130 is properly positioned for occupant comfort and safety during normal driving conditions. In a particularly preferred embodiment of the invention, the reinforcement 300 is mounted within the seat back portion 120 so that the headrest height is adjustable to a limited extent for the vehicle occupant. However, if the sensor 210 senses a condition for which roof reinforcement is desirable, the reinforcement 300 can be activated/deployed by an activation mechanism (discussed below) to extend upwardly within the seat back 120 so that it is properly positioned to reinforce the vehicle roof 200.

By way of example, a reinforcement 300 in accordance with the present invention may extend upwardly from four to six inches upon deployment. This distance varies by vehicle, and can depend on the distance between the top of the seat back portion 120 and the vehicle roof 200.

FIG. 3A is a front view of a reinforcement in accordance with the present invention. As shown, horizontal portion 320 extends between two vertical portions 310. Although the illustrated embodiment includes two vertical portions 310, the present invention contemplates one or more vertical portions. The horizontal portion 320 preferably extends across the top of the vertical portions 310, and spans the width of the vertical portions 310. In the embodiment illustrated in FIG. 3A, a crossbar 360 extends between the vertical portions 310 to increase the structural stability of the reinforcement 300.

The vertical portions 310 preferably are slidably seated in hollow pillars 330 so that they can slide vertically within the pillars 330 a predetermined amount. The pillars 330 are preferably fixedly mounted to the vehicle seat 100. In a preferred embodiment of the invention, an activation mechanism 340 is housed within the pillars 330 and is in direct or indirect contact with the vertical portions 310. The activation mechanism 340 is activated to drive the vertical portions 310 to an extended position substantially upward relative to the seat 100. Although the activation mechanism 340 shown in FIG. 3A is a coil spring, any known, suitable activation mechanism can be employed, including other spring systems and pyrotechnic devices (not shown).

Although FIG. 3A discloses an activation mechanism 340 for each of the two vertical portions 310 of the reinforcement 300, the present invention also contemplates a single activation mechanism for the reinforcement 300, even if there is more than one vertical portion, or other suitable combinations of numbers of activation mechanisms and vertical portions.

FIG. 3B illustrates a side view of the reinforcement shown in FIG. 3A, taken along line 3B-3B. In this embodiment, the activation mechanism 340 is shown to be in direct contact with a bottom surface 350 of the vertical portion 310 that it activates.

The reinforcement 300 preferably comprises a retaining mechanism that retains the support structure in its extended/deployed position. The retaining mechanism is shown to include a cutout portion 370 of the pillar 300, into which, for example, a spring-loaded or otherwise biased protrusion (not shown) passes through the cutout portion 370.

In a preferred embodiment of the invention, a cushion is provided to protect the occupant's head when the headrest 130 has been extended to an activated position. The cushion may include, as illustrated in FIG. 2, a portion 140 of the seat 100 that extends from the seat back 120 to protect the occupant's head. Additionally or alternatively, the present invention contemplates a soft coating for the vertical portions 310 to protect the occupant's head, or an air bag that can be deployed with the reinforcement 300 to replace the headrest 130 upon deployment.

FIGS. 4A through 4C illustrate contemplated cross sections of the at least one vertical portion 310 of the reinforcement 300. While three possible shapes are illustrated, the present invention contemplates a variety of suitable shapes and sizes for the vertical portion's cross section. FIG. 4A illustrates a modified C-shaped cross section having an outer wall 410, two side walls 420 and two additional walls 430 that increase the structural strength of the vertical portion. In one exemplary embodiment, the cross-sectional dimensions of the vertical portion are 15 mm×50 mm, with the walls having a thickness of about 2 mm.

FIG. 4B illustrates another exemplary embodiment of a cross section of the vertical portions. This C-shaped cross section includes the outer wall 410 and side walls 420 of the modified C-shaped cross section, but does not include the additional walls 430. In use, the outer wall 410 is preferably located at an outermost side location S (see FIG. 3A) of the reinforcement 300. This arrangement of the outer wall 410 increases the structural strength of the reinforcement for the forces characteristic of vehicle rollover. FIG. 4C illustrates a known I-shaped cross section.

In a preferred embodiment, the reinforcement 300 comprises ultra high strength steel (UHSS). In a particularly preferred embodiment, the reinforcement 300 comprises boron. The present invention contemplates different components of the reinforcement 300 being made from different suitable materials. The materials should be suitably light and strong, and also should be economically feasible to use.

FIG. 5 illustrates an embodiment of an activation mechanism for a reinforcement in accordance with the present invention. Sensor 210 is capable of sensing a crash condition for which vehicle roof reinforcement is desirable, such as a vehicle rollover. Sensor 210 is preferably connected to the activation mechanism 340 for the reinforcement 300 via an electrical line 220. As shown in FIG. 5, when the activation mechanism 340 is a pre-loaded spring or other preloaded spring system, a pre-tension device 500 may be provided between the sensor 210 and the activation mechanism 340. The pre-tensioner 500 pulls a cable 510 that slides a plate 520 extending into the pillar 330 to release the spring to activate the vertical portion 310 residing in the pillar.

Upon sensing a crash condition for which vehicle roof reinforcement is desirable, the sensor 210 sends a signal to the reinforcement 300 via the electrical line 220 to activate the activation mechanism 340 and suitably deploy the reinforcement 300 so that it reinforces the vehicle roof 200. As stated above, although the activation mechanism 340 is depicted as a coil spring, any known, suitable activation mechanism can be employed, including other spring systems and pyrotechnic devices.

Figure 6:
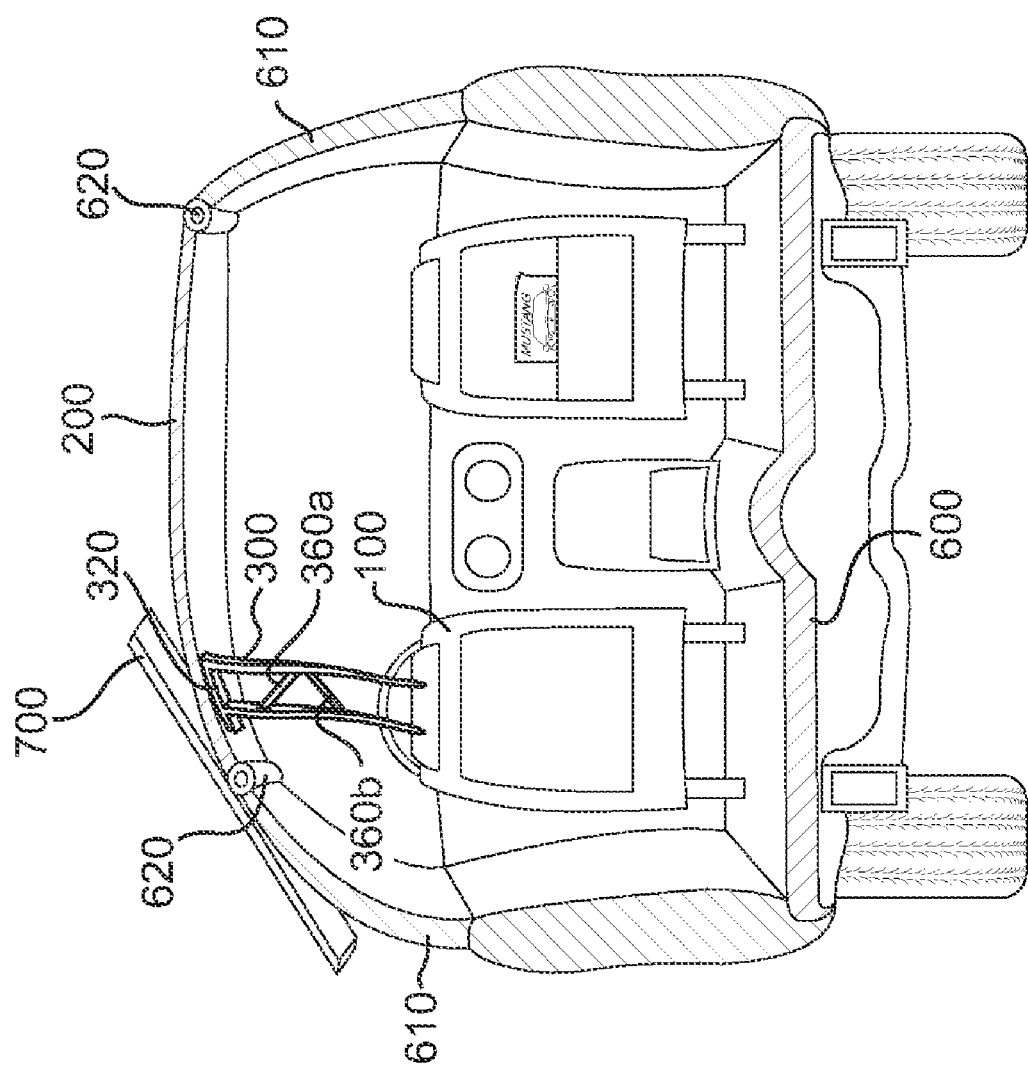
FIG. 6 illustrates an embodiment of a reinforcement in accordance with the present invention, being utilized in a vehicle during a rollover simulation test.

FIG. 6 schematically illustrates a reinforcement in accordance with the present invention, being utilized in a vehicle during a rollover simulation test. The reinforcement 300 is shown extending from a seat 100 of a vehicle. The embodiment of the reinforcement 300 illustrated in FIG. 6 includes two crossbars 360a and 360b. In the embodiment of the reinforcement shown, when employed during a rollover condition or simulated rollover condition, crossbar 360a is in compression and crossbar 360b is in tension.

The simulated rollover condition is created when a simulator plate 700 impacts the vehicle with a given force. The force can be, for example, based on the calculated forces exerted during a rollover, or based on a set weight such as a multiple of the vehicle's weight. As stated above, FMVSS 216 requires that, by 2009, a vehicle's roof structure will have to support 2.5 times the vehicle weight or 5,000 pounds, whichever is less. The simulator plate 700 commonly impacts the vehicle at the junction of the sides 610 and roof 200 of the vehicle, in the area of both the A pillar (not shown) and the roof rail 620 of the vehicle.

As can be seen in FIG. 6, the activated reinforcement 300 extends toward the roof of the vehicle and may stop just short of the roof or upon contacting the roof. Extension is stopped when the protrusion of the retaining mechanism passes through the cutout portion 370 and retains the reinforcement in its extended portion as discussed above. Upon actual or simulated rollover impact, roof crush is limited when the roof contacts the reinforcement 300 because the reinforcement provides support that limits further crush.

The reinforcement 300 is preferably mounted to the vehicle seat 100. Although vehicle seats are commonly reinforced to a limited extent in a number of ways to increase occupant safety in the event of side or rear impact collisions, the seat 100 supporting the reinforcement 300 may include additional framing to allow the seat 100 to provide a suitable support for the reinforcement 300. The seat 100 is commonly mounted to the vehicle floor 600. The present invention contemplates reinforcing the vehicle floor 600 so that it provides a suitable support for the seat 100 and the reinforcement 300.

With respect to the forces commonly generated during vehicle rollover, components of the vehicle that provide occupant protection during a rollover condition, such as the A-pillars, B-pillars, C-pillars, rails, and headers, are subject to bending forces during rollover due to their position relative to the forces generated during rollover. The bending forces that are generated during vehicle rollover cause deformation of these components, making them much less effective than a component positioned so that rollover forces act upon it axially. Similarly, forces applied to the vertical portions 310 of the reinforcement 300 during a vehicle rollover have both an axial component and a bending component. As a general principal, bending forces cause greater deformation of the vertical portion than do axial forces, so that the reinforcement 300, like other structural supports, is more effective against applied axial forces.

FIG. 7 illustrates exemplary forces acting on a reinforcement 300 being utilized in a vehicle during a rollover simulation test. As can be seen, the simulator plate 700 presses on the vehicle, exerting a roof crush force $F_1$ on the vehicle roof 200. The direction of the counter force $F_2$ exerted by an activated reinforcement 300 can, in part, depend on the position of the seat back 120 and is exerted at an angle $\alpha$ to the direction of the roof crush force $F_1$. Ideally, the reinforcement 300 would be positioned such that the counter force $F_2$ exerted by an activated reinforcement 300 would be directly opposite to the roof crush force $F_1$, as represented by force $F_3$. Such a position for reinforcement 300 would cause the rollover forces $F_1$ to act upon the vertical portions 310 of the reinforcement 300 axially, beneficially minimizing or eliminating bending forces applied to the vertical portions 310.

In addition to positioning the reinforcement 300 as a whole such that the counter force $F_2$ exerted by an activated reinforcement 300 would be directly opposite to the roof crush force $F_1$, the present invention contemplates the vertical portions 310 being curved (see FIGS. 3B and 8B) to minimize the angle $\alpha$ between the counter force $F_2$ exerted by an activated reinforcement 300 and the ideal direction $F_3$ for the counter force.

FIGS. 8A through 8C illustrate an embodiment of a reinforcement of the present invention. In the embodiment of FIGS. 8A through 8C, the reinforcement 300 has an overhanging top portion 320a. The overhanging top portion 320a is similar to the horizontal portion 320 of the previously-described embodiments of the reinforcement 300. However, in addition to extending between vertical portions 310, the overhanging top portion 320a also extend past the vertical portions 310 on at least one side of the reinforcement 300.

The overhanging top portion 320a preferably has a length and a direction of overhang that, upon actuation of the reinforcement, provides early roof engagement in the event of roof crush. This is because, based on the most common characteristics of roof crush, the overhanging top portion 320a extends into the crush zone and thus makes earlier contact with the roof during roof crush. This can be seen in the schematic illustration of a vehicle rollover simulation test presented in FIG. 6.

Figure 9:
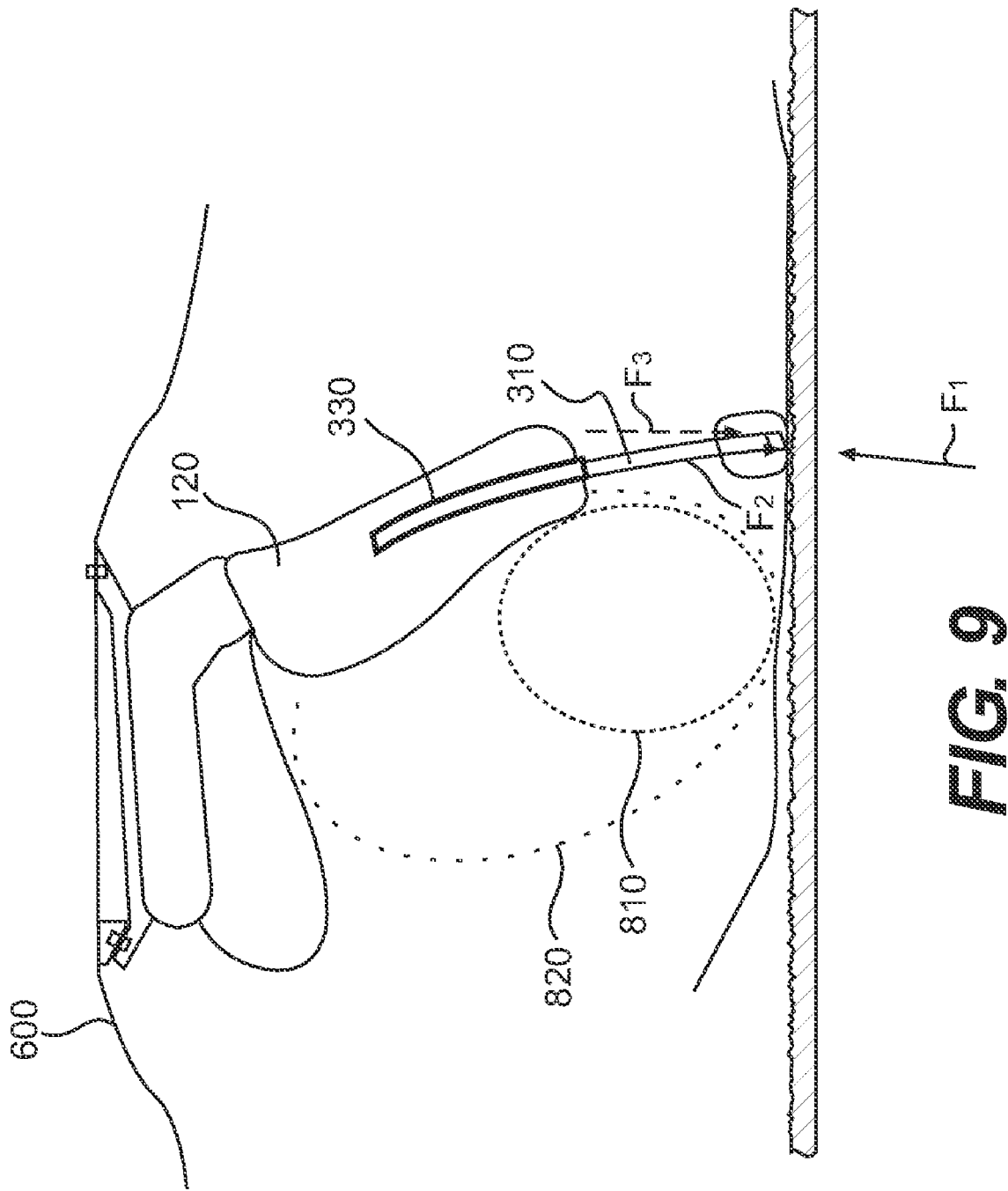
FIG. 9 illustrates exemplary forces acting on a reinforcement of the present invention during vehicle rollover, and also illustrates exemplary deformation of a vehicle floor and roof during rollover.

FIG. 9 illustrates exemplary forces acting on a reinforcement 300 of the present invention during vehicle rollover, and also illustrates exemplary deformation of a vehicle floor 600 and roof 200 during rollover. The reinforcement 300 is mounted directly or indirectly to the vehicle floor 600, and is activated when the sensor 210 (see FIG. 2) senses a crash condition for which vehicle roof reinforcement is desirable. When activated, the reinforcement 300 extends to contact the vehicle roof 200 to reinforce the roof during rollover.

The reinforcement 300 also cooperates with the vehicle floor 600, via the seat 100, to provide an amount of floor deformation upon rollover to absorb collision energy while maintaining an area of occupant headroom as well as a safe passenger space between the roof 200 and the floor 600. In FIG. 9, occupant head room is generally illustrated at 810. The safe passenger space, which includes the space necessary to prevent major injuries to an occupant, is generally illustrated at 820.

Floor deformation can increase collision energy absorption during a rollover event, which is beneficial because it can lessen the duration of the rollover by absorbing some of the energy that must be dissipated during the rollover. In most vehicles, the seat is stronger than the floor because the seat is designed to protect the occupant from front and rear impacts, allowing the floor to deform while the seat maintains its integrity and maintains a safe passenger space 820.

The present invention contemplates the reinforcement 300 being provided at any number of positions within the vehicle. For example, the reinforcement 300 may be provided only for the driver of the vehicle, or may additionally be provided for the front passenger and even rear passengers. This method and device for reinforcing a vehicle roof can beneficially maintain a lower center of gravity in vehicles, and uses a minimal amount of material to provide a desired amount of reinforcement.

What is claimed is:

1. A method of making an occupant safety device for a motor vehicle having a roof, the method comprising:

providing a support structure comprising:

a first substantially vertical portion;

a second substantially vertical portion spaced from the first substantially vertically portion in a direction of an interior of the vehicle; and an overhanging upper portion comprising a metal or metal alloy and having a height measured in a vertical direction, the overhanging upper portion extending from the second substantially vertical portion to the first substantially vertical portion, and substantially horizontally beyond the first substantially vertical portion toward an exterior of the vehicle a distance greater than the height of the overhanging upper portion to provide early roof engagement upon actuation in the event of roof crush; and slidably mounting the support structure in the motor vehicle.

2. The method of claim 1, wherein the support structure can be activated to slide vertically upwardly within the vehicle to cooperate with the vehicle's roof to increase the amount of weight that the roof can support.

3. The method of claim 1, further comprising providing an activation mechanism to activate the support structure.

4. The method of claim 3, wherein the activation mechanism comprises at least one spring.

5. The method of claim 3, wherein the activation mechanism comprises a pyrotechnic device.

6. The method of claim 1, further comprising providing a first headrest portion attached to the support structure and at least partially surrounding the overhanging upper portion, which acts as a headrest when the support structure is not activated.

7. The method of claim 1, further comprising providing a retaining mechanism adapted to retain the support structure in an extended position.

* * * * *